US011622265B2

(12) United States Patent
Leedom, Jr.

(10) Patent No.: US 11,622,265 B2
(45) Date of Patent: Apr. 4, 2023

(54) SECURITY SYSTEM FOR HANDHELD WIRELESS DEVICES USING TIME-VARIABLE ENCRYPTION KEYS

(71) Applicant: MLR, LLC, Locust Grove, VA (US)

(72) Inventor: Charles M. Leedom, Jr., Locust Grove, VA (US)

(73) Assignee: MLR, LLC, Locust Grove, VA (US)

( * ) Notice: Subject to any disclaimer, the term of this patent is extended or adjusted under 35 U.S.C. 154(b) by 0 days.

(21) Appl. No.: 17/849,875

(22) Filed: Jun. 27, 2022

(65) Prior Publication Data

US 2022/0408244 A1 Dec. 22, 2022

Related U.S. Application Data

(60) Continuation of application No. 16/869,940, filed on May 8, 2020, now Pat. No. 11,375,366, which is a
(Continued)

(51) Int. Cl.
*H04L 29/06* (2006.01)
*H04W 12/04* (2021.01)
(Continued)

(52) U.S. Cl.
CPC .............. *H04W 12/04* (2013.01); *H04L 9/006* (2013.01); *H04L 9/0869* (2013.01);
(Continued)

(58) Field of Classification Search
CPC . H04W 12/04; H04W 12/0431; H04W 12/06; H04W 84/00; H04W 12/33;
(Continued)

(56) References Cited

U.S. PATENT DOCUMENTS

2002/0026578 A1* 2/2002 Hamann ............... H04L 9/3263
713/159
2005/0015448 A1* 1/2005 Smith .................. H04L 63/105
709/228
(Continued)

OTHER PUBLICATIONS

N. P. Smart and H. L. Muller, "Awearable public key infrastructure (WPKI)," Digest of Papers. Fourth International Symposium on Wearable Computers, Atlanta, GA, USA, 2000, pp. 127-133, doi: 10.1109/ISWC.2000.888474. (Year: 2000).*

*Primary Examiner* — Shawnchoy Rahman
(74) *Attorney, Agent, or Firm* — Tollefson IP

(57) ABSTRACT

In one embodiment, the invention provides a portable wireless personal communication system for cooperating with a remote certification authority to employ time variable secure key information pursuant to a predetermined encryption algorithm to facilitate convenient, secure encrypted communication. The disclosed system includes a wireless handset, such as PDA, smartphone, cellular telephone or the like, characterized by a relatively robust data processing capability and a body mounted key generating component which is adapted to be mounted on an individual's body, in a permanent or semi-permanent manner, for wirelessly broadcasting, within the immediate proximity of the individual, a secret or private key identifying signal corresponding to a time variable secure key information under the control of the certification authority. The key identifying signal is generated in a format that facilitates secure wireless communication with the individual in accordance with a predetermined encryption algorithm including a PKI encryption algorithm. The disclosed system may be used with a console for coordinating access to a variety of different communication system and networks.

21 Claims, 4 Drawing Sheets

Related U.S. Application Data continuation of application No. 15/387,310, filed on Dec. 21, 2016, now Pat. No. 10,652,734, which is a division of application No. 14/283,044, filed on May 20, 2014, now Pat. No. 9,531,548, which is a continuation of application No. 13/723,240, filed on Dec. 21, 2012, now Pat. No. 8,732,459, which is a continuation of application No. 11/474,285, filed on Jun. 26, 2006, now Pat. No. 8,341,397.

(51) Int. Cl.
| | | |
|---|---|---|
| *H04W 12/06* | (2021.01) | |
| *H04L 9/40* | (2022.01) | |
| *H04L 9/00* | (2022.01) | |
| *H04W 12/0431* | (2021.01) | |
| *H04L 9/32* | (2006.01) | |
| *H04L 9/08* | (2006.01) | |
| *H04W 84/00* | (2009.01) | |

(52) U.S. Cl.
CPC ........ *H04L 9/3263* (2013.01); *H04L 63/0442* (2013.01); *H04L 63/068* (2013.01); *H04W 12/0431* (2021.01); *H04W 12/06* (2013.01); *H04L 63/0823* (2013.01); *H04L 2209/80* (2013.01); *H04W 84/00* (2013.01)

(58) Field of Classification Search
CPC ..... H04L 9/006; H04L 9/0869; H04L 9/3263; H04L 63/0442; H04L 63/068; H04L 63/0823; H04L 2209/80
See application file for complete search history.

(56) References Cited

U.S. PATENT DOCUMENTS

| | | | | |
|---|---|---|---|---|
| 2006/0045271 | A1* | 3/2006 | Helbig | ............... H04L 63/0853 380/270 |
| 2008/0022089 | A1* | 1/2008 | Leedom | ............... H04W 12/06 713/156 |

* cited by examiner

SECURITY SYSTEM FOR HANDHELD WIRELESS DEVICES USING TIME-VARIABLE ENCRYPTION KEYS

CROSS-REFERENCE TO RELATED APPLICATIONS

This application is continuation of application Ser. No. 16/869,940, filed on May 8, 2020, which is a continuation of application Ser. No. 15/387,310, filed on Dec. 21, 2016, now U.S. Pat. No. 10,652,734, which is a division of application Ser. No. 14/283,044, filed on May 20, 2014, now U.S. Pat. No. 9,531,548, which is a continuation of application Ser. No. 13/723,240, filed on Dec. 21, 2012, now U.S. Pat. No. 8,732,459, which is a continuation of application Ser. No. 11/474,285, filed on Jun. 26, 2006, now U.S. Pat. No. 8,341,397. The entire contents of each of the listed applications are hereby incorporated herein by reference.

FIELD OF THE INVENTION

This invention relates to systems and components for providing secure communication and unique identification/authentication for users of handheld wireless devices.

BACKGROUND OF THE INVENTION

For mostly practical reasons associated with poor engineering choices and design, encryption techniques have failed to deliver on the promise of secure communication. This is especially true with respect to modern communication networks such as cellular telephone, landline telephone, internet or other public and/private communication networks. In their definitive work on the subject of "Practical Cryptography," Wiley 2003, authors Niels Ferguson and Bruce Schneier state that "in the past decade, cryptography has done more to damage the security of digital systems than it has enhanced it," page xvii where they further state: "For the most part, cryptography has done little more than give Internet users a false sense of security by promising security but not delivering it. The reasons for this have less to do with cryptography as a mathematical science, and much more to do with cryptography as an engineering discipline. The fundamentals of cryptography are important, but far more important is how those fundamentals are implemented and used."

An understanding of why the practical use of encryption has failed to deliver on the promise of secure communication requires, first, an understanding of the fundamental elements cryptographic science. Ferguson et al explain that secure communication between two parties typically requires the generation of a "key" known by the parties who wish to communicate securely over a communication channel. For this reason, key management and key storage is crucial to any cryptographic system.

In its simplest form, secure communication between two parties typically requires implementation of a key negotiation protocol to set up a secret session key K. Thereafter, the two parties can use K along with an agreed upon encryption and decryption function (which may or may not be secret) to exchange data over a secure channel.

Symbolically this classical use of cryptography to permit secure communication between two parties can be represented as follows:

$$m,c := E(K_c, m) \rightarrow c, m := D(K_c, c) \text{ where}$$

m is the original message, called a message text, that is desired to be sent securely from one party to another party c is the encrypted message, called a ciphertext, created by the first party E is the encryption function used by the first party to create an encrypted version of the message using an agreed upon "key"

$K_c$ is the secret "key" previously agreed to by the two parties

D is the decryption function used by the second party to convert the ciphertext, c, back into the original message text, m While secure communication of messages could proceed provided either $K_e$ or D is kept secret, the use of a "secret" encryption/decryption function or algorithm is not only difficult but is actually dangerous because it often creates a false impression of security as explained more fully by Ferguson et al, supra, page 23. Secure communication, as practiced over modern communication systems, have often come to rely upon the use of known or "public" encryption functions or algorithms in combination with "secret" keys where some portion of the key required for a secure communication desired between two "parties" is known only to the sending party and to the receiving party. In this context, "parties" may refer to two terminal devices at each end of a communication channel. Because the parties may never have communicated before, implementation of a practical algorithm for establishing the "secret" key(s) to be used by the parties becomes a critical step for which only imperfect solutions have heretofore been proposed.

One technique that has been widely adopted is referred to as "public-key" encryption which is a technique whereby each member of a large pool of "parties," who may wish to communicate, publishes in advance a "public" key that can then be used by any other member of the pool of potential users to send a message securely using a publicly known encryption function. This approach can be represented as follows:

$$m,c := E(P_{receiving\ party}, m) \rightarrow c, m := D(S_{receiving\ party}, c)$$
where $P_{receiving\ party}$ is the public portion of a pair of keys using a special algorithm that the receiving party publishes to all parties of a group who may wish to send a message securely $S_{receiving\ party}$ is the secret portion of the pair of keys generated by the special algorithm When one party in the group (the sending party) wants to send a message to another party (the receiving party), the sending party merely looks up the public key, $P_{receiving\ party}$, of the receiving party and uses $P_{receiving\ party}$ to encrypt the message, m, to form the cyphertext, c, to be sent over the communication channel. When the cyphertext is received, the receiving party uses her secret or private key, $S_{receiving\ party}$, to retrieve the message m. This process, referred to as "asymmetric-key" encryption or public-key encryption, works so long as the key-pair generation algorithm, encryption algorithm, and decryption algorithm produce the original message accurately. Practical systems implementing this concept have been developed and used successfully and extensively.

Implementation of public-key techniques provides a major advantage in that it becomes unnecessary to negotiate a secret or private key with a party to whom an encrypted message is to be sent in advance of initial communication with that party. However, there is a trade off. To be secure public-key encrypted communications requires large integer arithmetic which is not easy to implement in the absence of sophisticated software/hardware specifically adapted to handle the necessary calculations. The relative inefficiency of public-key encryption (as compared with secret key encryption) means that both are used. For example, public key encryption can be used to negotiate a secret or private key that is then used to enable secure communication far more efficiently. Doing large integer arithmetic in a higher-level language is typically several times slower than an optimized implementation for the platform. Therefore there is a significant gain to be had by using platform-specific code for the large integer routines. (Ferguson et al. supra, page 279)

Secure communication demands yet another step, namely, "authentication," to insure that messages received are actually sent by someone who is authorized to send the message. This problem is solved by providing or generating a message authentication code or MAC which may be used to send each message m. Like encryption, authentication uses a secret or private key, $K_a$, that the sending and receiving parties both know. The MAC for each message, a, can now be generated using a MAC function, h. The process can be represented as follows:

$$m, a := h(K_a, m) \rightarrow m, a := h(K_a, m)$$

When a supposedly "authenticated" message is received by a party who knows the correct authentication key, $K_a$, the function, h, can be used to determine if a correct value, $\alpha$, can be derived. If yes, then the message is authenticated.

Message authentication can be used in a public-key environment to create a "digital signature" for verifying the authenticity of a message. This may be represented as follows:

$$m, s := a(S_{sending\ party}, m) \rightarrow c, v(P_{sending\ party}, m, s)?$$
where o is a signature creating algorithm
v is a verification algorithm The important consequence is that a digital signature for a message is created by a secret or private key S generated by the sending party yet the digital message signature can be verified by anyone simply by knowing the public key of the sender, $P_{sending\ party}$. It is important to recognize that a digital signature is typically generated by a data processing device. Thus, the digital signature is no proof that a given user has authorized a message or even seen the message. As stated by Ferguson et al. infra at p. 29, "Given the ease with which viruses take over computers, the digital signature actually proves very little. Nonetheless, when used appropriately, signatures are extremely useful."

Use of public-key/secret-key pairings can greatly simplify secure communication but each party who wishes to send a secure message must obtain the public key of the person to whom the message is to be sent. This problem can be solved by a public key infrastructure, PKI, which can be established to operate as a central certification authority, called a certificate authority, CA When a user, Jane Doe, presents the required personal identification and her self generated public key, the certificate authority, CA, issues a digital signature that essentially states "I, the CA, have verified that public key $P_{sender}$ belongs to Jane Doe."

The creation of a CA gives rise to the following interesting simplification in secure communication. Assume that a sending party already has the CA's public key and has verified that it is correct. The sending party can then retrieve a public key (or be sent a public key) along with a certificate of the public key for another party to whom a message is to be sent. Using the retrieved key and the public key of the CA, the sending party can verify the certificate on the key using the CA's public key. This certificate ensures that the sending party has the correct key with which to communicate with the party to whom the message is to be sent. In a PKI, each participant only has to have the CA certify his public key, and know the CA's public key so that he can verify the certificates of other participants. For the PKI to function, every participant must be able to trust the CA which, for many practical reasons, is not always possible. To quote Fergus et al at p. 316, "The ultimate dream is a universal PKI. A large organization, like the post office, certifies everybody's public key. The beauty of this is that every person only needs to get a single key certified, as the same key can be used for every application. Because everybody trusts the post office, or whatever other organization becomes the universal CA, everybody can communicate securely with everybody else, and they all live happily ever after. If our description sounds a bit like a fairly tale, that is because it is. There is no universal PKI, and there never will be."

A number of practical problems are associated with implementation of a universal PKI. For example the simple requirement of associating a user's name and his public key turns out to be a non-trivial problem. A single individual may take on several different "on-line" names or, conversely, several people may use the same on-line name. For these and other practical problems discussed more fully by Ferguson et al. infra, pages 323, the use of smaller application-specific PKI's have worked much better than a single large one.

Organizing and supervising a CA for a large group of users is difficult when the users' objectives differ dramatically. Thus a CA for the customers of a bank will have entirely different criteria for granting certificates from a CA for a group of users who are authorized to enter a secure government facility or who are employees of a defense contractor. A single CA for all of these divergent user groups would have to accommodate a diverse number of objectives making the operation of a single CA extremely difficult. A better, more practical solution is to establish separate CA's for each group of users that have a sufficiently common interest to warrant the expense and complications of setting up and operating a CA.

Unless a government entity were to establish a CA, the motivation for establishing a CA will typically be profit driven. Thus, private CA's will normally be sponsored by banks, credit card companies, corporations wishing to operate private Wide Area Networks (WANs), telecommunications companies, or other type similar organizations that have need for secure communications. Any one of these organizations may establish a website and wish to interact with its users in a secure fashion. As one might expect, there has arisen a business of providing CA type services, exemplified by Verisign® (http://www.verisign.com/ssl/index-.html), to organizations having need for such CA type services such as those described. Such services may take the form of verifying the authenticity of websites to the user of a web browser so that the user can be sure that she is communicating with the lawful operator of the website with whom the user desires to interact. For example, a person who visits any website certified by Verisign using a browser having the appropriate verification algorithm will have a greatly increased confidence that she has not inadvertently accessed a site that is impersonating the desired website.

Difficulty arises however, where service providers, such as website operators, wish to receive and act on communications from customers, such as website visitors who wish to request shipment of goods or services and/or convey instructions for financial transactions such as the transfer of funds in payment for goods or services. Individuals may also be asked for sensitive information, such as when websites are operated to collect information pursuant to governmental functions such as receipt of payment for parking fines or collecting taxes. These functions typically require individuals to provide and/or receive sensitive information. For example, website operators may require highly sensitive information relating to the user's identity, credit card numbers, social security information etc. The requested information is typically needed to verify the identity of the individual who is requesting the services, shipment of goods, transfer of funds or other type information. Most user's are normally reluctant to provide such information for the understandable reason that the user does not wish to communicate such information to third parties where it may fall into the hands of individuals who may misuse the requested information.

In theory, encryption technology holds out the promise of solving many of the problems described above with respect to providing secure communication. Regrettably, the practical problems noted above often become insurmountable because the actions required on the part of the user or on the part of the data processing and communication systems are simply too complicated, expensive and inconvenient for widespread adoption.

What is needed is a system whereby an individual can uniquely and reliably identify himself as desired in a manner that allows the party receiving the identification to be highly confident in the identification via a simple, efficient system that does not require the individual to publish sensitive personal information that could, in the future, allow unscrupulous third parties to impersonate that individual. U.S. Pat. No. 6,189,098 to Kaliski, Jr. discloses a protocol for establishing authenticity of a client to a server by encrypting a certificate with a key known only to the client and the server. While useful for the purposes shown, the invention of the '098 patent does not involve a technique that is ideally suited to users of wireless devices.

Ferguson et al. recognizes the criticality and difficulty of storing long-term secrets, such as passwords and secret or private keys, infra, p. 347, and suggests the use of a PDA, cell phone or wristwatch "but to use them requires updates to the infrastructure." No suggestion is made for how to employ such devices into a PKI and how to use such devices in a manner that is convenient and efficient and is, at the same time, relatively immune from attack.

Wireless communication, particularly cellular communication, has revolutionized the way that humans communicate. The ubiquity of wireless communication and cellular communication has only exacerbated the problem of achieving acceptable security. Certain industry experts, e.g. Pyramid Research, have predicted total revenues world wide for wireless mobile communications will surpass total fixed communications service revenues in 2006 for the first time, with mobile operators generating US$653 billion to fixed operators' $608 billon. Rarely in the history of mankind has a technology so complex as wireless communication been adopted so quickly by so many human beings. From its origins in Scandinavia and the US and its early development and first commercial adoption in the United States in 1983, cellular communication will have advanced to include approximately 2.6 billion individual subscribers by 2006 and is predicted to reach as many as 3.5 billion subscribers by 2010 according to Pyramid Research http://www.pyr-.com/mbl_may17_mobsub.htm. Cellular communication is truly transforming the way that human beings communicate with each other and with remote sources of information, entertainment and services.

Even the relatively inexpensive cellular handsets in use today include fairly robust data processing capability of a type that was unavailable on the most advanced desk top computers or even main frame computers of a few years ago. Another startling fact is that the average cellular handset is being replaced approximately every two years which means that not only new cellular subscribers but existing subscribers are constantly adopting newer, more feature rich devices. These phenomena create a product based "vector" that has the ability to spread, very quickly, new standards for secure communication and creates an environment that is friendly to the implementation of very sophisticated technology, such as encryption techniques, that has previously failed to realize its promised potential.

Heretofore, attempts have been made to marry wireless communication technology with unique identification and encryption technologies to achieve convenient, secure communication in a manner to facilitate securable identification, controlled access to secure facilities and secure financial transactions as well as other functions requiring unique identification of individuals. For example, enhanced identification appliances have been proposed as in US Patent Application 20030173408 to Mosher et al. in which a "wearable" appliance such as a wristband, bracelet, patch, headband, neckband, ankleband, legband, card, or sticker is disclosed which may be provided with biometric sensors for obtaining information about the wearer such as fingerprint, retina, iris, blood, DNA, genetic data, voice pattern or other characteristics to aid in identifying the individual. Various types of scanning components may be associated with the appliance to aid in transferring the information stored in the appliance. Such components include bar code devices, radio frequency devices (RFID) and more sophisticated communication circuitry employing, for example, Bluetooth® technology. The application specifically teaches the advantages of an appliance that is attached to the user's body for identification purposes in contrast to the use of a "credit card, ticket or the like" and also notes the advantage of using transponder circuitry including an antenna for converting electromagnetic energy into electrical signals for energizing the body worn appliance. While useful for the purposes disclosed, appliances of this type do not suggest how to avoid unauthorized access to the stored data in such a way as to facilitate secure communication using the stored user identification information nor is there any suggestion of how to afford to the user a wide range of secure communication and entertainment services via a handheld device with a full display and touch sensitive user interface.

U.S. Pat. No. 5,450,491 to McNair discloses an authenticator card such a credit card "smart card" that uses encryption technology to create a changeable bar code display (adapted to be read by conventional bar code readers) for displaying an encrypted message including the identification of the card holder, his account and additional information such as the date and time that insures that the message will be different each time the card is used. In this fashion, interception of the encrypted message will not empower the interceptor to use the information to improperly access the rightful owner's account without knowing a great deal of information that is unavailable from the message itself. Other patent documents (U.S. Pat. No. 5,153,842) have disclosed devices capable of displaying a changeable bar code. Again, while useful for the purposes disclosed, this device can not prevent unauthorized use of the disclosed "smart card" by someone who has found or stolen the card.

In US Patent Application 20010034717 discloses a far more versatile invention for assisting in access control, identification and financial transactions including a portable device such as a cellphone or PDA that includes circuitry for implementing sophisticated encryption algorithms that result in messages that can be decrypted by a certification authority that can verify and certify secure information, such as the user's identity, or authorize secure financial instructions or other secure communication. In one embodiment, the disclosed invention is disclosed for implementation in a cellular telephone that has the capability of displaying an encrypted bar code (including both one dimensional and two dimensional bar codes) containing encrypted messages identifying the user and/or his bank account or other secure information. Again this invention is useful for its disclosed purposes but does not become automatically inoperable when someone other than the authorized user attempts to use the device after either finding or stealing it.

In U.S. Pat. No. 6,853,988 to Dickinson et al., a cryptographic system is disclosed that provides a remote trust engine server for storing cryptographic keys and authentication data which allows users of portable wireless devices (e.g. cell phones) to access various services via a wireless network. This patent discloses varying degrees of authentication, col. 7, lines 35-38, and provides operability over multiple algorithms, keys, standards, certificate types and issuers, protocols etc., col. 2, lines 25-30. In addition, this system allows for added security features involving pin number or "token based" user input as well as bio-metric signals of the type resulting, for example, from finger print scans. The disclosed system does not, however, disclose time varying keys that correspond to variable key information held by the trust engine.

US Published Patent App. 20060094461 addresses the problem of a peripheral device (such as a keyboard) negotiating a key pairing for secure communication but it solves the problem by requiring an initial "wired" connection that is impractical in many situations.

US Published Patent App. 2006005035 discloses a secure automated login for a computing system wherein an interrogation signal is sent to an electronic tag worn by a user upon detection of the proximity of the user. If a correct return signal is received then the user is logged in automatically. This system does not appear to prevent duplication of a tag and improper use of the duplicated tag to secure unauthorized logon. Another type of wireless tag or security badge is disclosed in U.S. Pat. No. 5,960,085. Similarly, US Published Patent App. 20060089126 discloses the concept of causing a cellular telephone to operate only when it has received an appropriate signal from an identification tag (par. 35) but does not suggest how the information on the tag could be made time variable and useable only when the retrieved signal is authenticated by a remote certification authority.

US Published Patent App. 20040247130 discloses a key information issuing device for issuing key information to a key information retaining device which includes an authentication module authenticating an issuer of the key information. Also disclosed is an output module outputting the key information to the key information retaining unit, and a recording module recording a mapping of the issued key information to the key information retaining unit. The key information is issued in response to an indication of the authenticated issuer. The '130 application invention does not appear to appreciate the advantages and the manner by which its broad concepts could be employed in the environment involving a wireless handset.

Published Patent App. 20060085844 discloses a wireless token for use in a credential issuing system for providing access to a network and suggests that the token can take the form of smart cards, credit cards, dongles, badges, biometric devices such as fingerprint readers, mobile devices such as cellular telephones, PDAs, etc. In some embodiments, the token includes circuitry used in a typical smart card. For example, the token may store an encrypted password that may be sent to an authentication system. However, this application does not suggest how the disclosed concepts could be used to enhance security in the use of a handheld wireless device.

Cellular network(s) to some degree are already presented with the need to uniquely identify individual cellular handsets to insure accurate billing and monitoring of a subscriber's use of her handset. However, the portability and ubiquitous use of cellular handsets means that they are frequently misplaced, lost or stolen, and yet, the cellular telephone remains completely operable by anyone who may come into possession with the cellular handset unless the handset has a "password protected" mode of operation (as most cellular handsets have) and the user has placed the cellular handset in its "password protected" mode whereby it requires the input of a password before the phone can be activated by another (which most cellular handsets are not).

In short, a significant unmet need exists for methods and apparatus whereby encryption technology can be used for wireless data communication in a manner that exploits the full promise of encryption technology to produce secure communication and unique user identification while affording reasonable convenience to the end users.

SUMMARY OF THE INVENTION

This invention seeks to capitalize on the product "vector" created by the vast number of new cellular handsets placed in operation each year to implement and disseminate a new type of communication standard and infrastructure employing encryption technology in a manner that is highly immune from attack and yet is relatively convenient to use. More particularly this invention involves application of encryption technology to personal wireless communication in a unique manner to solve privacy and reliability problems associated with secure communication and unique user identification through the use of a pair of differentiated personal wireless components adapted to interact with a complementary communication grid including wireless and line-of-sight communication links. The use of differentiated wireless components is important to the invention because it provides added convenience for the user while preserving the high level of reliability necessary to make practical the wireless and line-of-sight control of authorized access, financial transactions or other functions that depend on secure communication and the reliable unique identification of individuals.

The subject invention includes the provision of a portable wireless personal communication system for cooperating with a remote certification authority to employ time variable secure key information pursuant to a predetermined encryption algorithm to facilitate convenient, secure encrypted communication. An important aspect of the invention is the provision of a body mounted key generating component which is adapted to be mounted on an individual's body, in a permanent or semi-permanent manner, for wirelessly broadcasting, within the immediate proximity of the individual, a secret or private key identifying signal corresponding to the time variable secure key information under the control of the certification authority. The key identifying signal is generated in a format that facilitates secure wireless communication with the individual in accordance with the encryption algorithm.

Another important aspect of the invention is the provision of a handheld wireless component adapted to receive the key signal broadcast by the key generating component for use in implementing secure communication in accordance with the predetermined encryption algorithm. The handheld component is adapted to receive the key identifying signal broadcast by the body mounted key generating component for use in implementing a wireless and/or line-of-sight link that forms part of a communication channel connected at one end to the handheld wireless component and connected at the other end to third parties that are or have communicated with the certification authority in accordance with the encryption algorithm, whereby the certification authority may operate in accordance with the predetermined encryption algorithm, such as used in a Public Key Infrastructure, PKI, to facilitate secure communication between the individual and one or more of the third parties.

In another aspect of this invention, a convenient method is used by which an individual may uniquely identify himself via a wireless or line-of-sight optical signal communicating with an "authenticating authority," including a time varying "authentication signature" having the characteristic that it can be relied upon, to a high degree, by receiving parties to uniquely identify the individual having dominion over the apparatus producing the "authentication signature" provided the receiving parties have a "trust relationship" with the authenticating authority. A time varying "authentication key" may be securely broadcast in encrypted form that is suitable for forming the "authentication signature" associated with a particular secure message for transfer over various communication networks including cellular, landline telephone, cable, private local area networks or other types of private or public communication networks or webs such as the internet.

The differentiated components may include, at least, a first component that is designed to be permanently or semi-permanently attached to the user's body and includes a storage medium and, at least, minimal data processing capability for producing a series of time variable keys such as authentication keys corresponding to authentication keys held by an authenticating authority that is capable of certifying the identity of the user with whom the component is permanently or semi-permanently associated. Another important feature of the first component is its ability to wirelessly broadcast the authentication keys when desired by the user either automatically (subject to being turned on or off by the user) or upon response to an activating and/or energizing signal produced by user command or by receipt of a wireless signal requesting an authorizing signal. When operating in the later mode, the component would behave as a transponder and would include a transponder circuit that causes the broadcasting of a secret or private key signal upon receipt of an inquiry signal whereby the key signal would be retrieved from memory or would be generated in a manner that corresponds to key signal information retained/generated buy a certification authority that is capable, among other things, of uniquely identifying the individual upon which the first component is mounted.

The second component may take the form of a portable personal communication device such as a wireless handheld device such as PDA, smartphone, cellular telephone or the like which is characterized by a relatively robust data processing capability. Using this capability the second component would be capable of receiving, wirelessly, a secret key, such as an "authentication key," from the first component for use in encrypting a message to be sent wirelessly from the second component or a private key that is paired with a previously published "public key" for use in decrypting a message forwarded from a third party who used the public key to encrypt a message sent wirelessly to the handheld component. Public key encryption/decryption requires large integer processing capability and thus the second component would preferably be equipped with special platform specific circuitry and software suitable for this purpose.

By employing, as a "disseminating vector," a handheld device such as a cellular telephone, PDA or smartphone as a component in the practical implementation of this invention, billions of human beings can potentially benefit from the operation of a single or relatively small number of certifying authorities to facilitate unique identification of individual users. Implementation of the subject invention will require cell phone subscribers to be provided with a separate body-mounted key generating component that is procured at the same time as the cellphone, PDA or other type handheld wireless device adapted to access the cellular network or other private or public communication network.

Each of these steps of key retrieval and subsequent encryption and decryption will become necessary precedents for the user to obtain desired functions, such as a secure financial transaction, admission into a secure facility, and/or the sending or receipt of any other type of communication requiring security and reliability. However, the user will not be inconvenienced in any way since the process would be entirely automated and transparent to the user except in circumstances when a password entry and/or a bio-metric test is required or the user is required to manipulate the handset in order to allow for line-of-sight reading of an encrypted message, such as a bar code display on the handset display screen.

One aspect of the second component is that it may include a user interface that affords the user the ability to monitor and to control the wireless communication process in an efficient manner that protects the user's privacy. Another aspect of the subject invention is that the handset is automatically incapacitated should it be lost or removed from the immediate proximity of the user. The second component may take the form of a wireless handheld device such as a cellular telephone, smartphone or other type of wireless PDA adapted to communicate over a variety of different wireless networks including any one or a combination of local area networks; WiFi or other low power, wireless technology permitting public use or access; cellular networks, such as GSM, CDMA, TDMA, AMPS etc; or other type of public or private network such as a business operated LAN or public network or web including the internet.

One particularly desirable application of the subject invention would be to point of sale transactions that are typically implemented today using various types of media including cash, checks, charge cards, coupons, debit cards, bar codes or other media in combination with information such as names, account numbers, passwords, or other information passed between the merchant and customer all of which is designed to uniquely identify the customer and merchant and to memorialize the nature of the transaction in order to effect a legally binding transfer of money and other rights among the parties involved. The subject invention could be used to simplify and automate this process while improving greatly the subsequent verifiability of the parties involved and the nature of the transactions and associated exchange of rights.

By using two separate components, one body mounted permanently or semi permanently and the other a hand held device that is wirelessly connected to the first component to receive the secret or private key, it will be possible to achieve relative immunity from unscrupulous attack while preserving substantial user convenience. For example, the secret or private keys stored and/or generated and transmitted wirelessly by the first component could be time variable and thus suitable for encrypted communication or unique user identification only once or for a limited number of times. For example, because, the key generating component requires far less data processing capability and only short range wireless communication capability, it can be permanently or semi-permanently attached to the user's body such as by being incorporated into a wristwatch, wristband, bracelet, ring, patch, headband, neckband, ankleband, legband, card, sticker or the like or even mounted subcutaneously. The hand held device, on the other hand can have a much greater data processing capability and much greater wireless broadcasting range. These qualities allow the handheld component to decrypt incoming messages using large integer mathematics as is necessary in certain PKI encryption systems. Most importantly, loss of the handheld device, should it occur, would not create a breach in system security because the secret or private key information retrievable form the body mounted component would be time variable in accordance with pre-arrangement with the certification authority. Alternatively, the secret or private key information could be valid for only a limited window of time again in accordance with a pre-arrangement with the certification authority.

One of the advantages of the present invention is that the cellular handset can be designed to become inoperable when it is more that a certain minimum distance from the body mounted key generating component. This feature can be implemented by causing the cellular handset to broadcast a transponder signal and by including a transponding circuit in the body mounted key generating component to return a wireless activating signal which would allow the cellular handset to operate. The inactivation of the handset could be limited to use of the phone to make outgoing calls or send other type outgoing messages but allow incoming calls to be received so that the user could still call her phone should it be misplaced. In this manner the audible ring could still be used to help the user locate a misplaced cellular phone yet the phone would be useless in the hands of someone who has acquired the phone without permission of the owner and tries to make outgoing calls or send outgoing messages.

The certification authority, CA, could be operated by a single cellular network service provider or by a combination of cellular network service providers or by a separate CA service provider that could be either privately or governmentally operated. For example, a cellular service provider might find it desirable to offer a credit card/debit card sponsored service as part of its range of services. A CA servicing each cellular subscriber for that particular network service provider could also provide certifying functions for the various merchants who agree to allow subscribers to sue their cell phones as virtual credit cards or debit cards. The present invention contemplates that an entire business method could be fashioned around the provision of body mounted key generating components paired with cellular phones designed to interact with the corresponding key generating components. This business method could be implemented by the cellular service provider or it could be implemented entirely independently with certifying services and companion credit card/debit card services being offered to all of the customers of one or more cellular service providers. The development of the operating standards and implementing software for the CA, cellphones and companion body mounted devices could also be provided pursuant to a franchising business method in much the same way that Visa or Mastercard licenses are granted to banks and other financial institutions.

The subject invention provides a certification apparatus for uniquely identifying individuals by implementing an encryption algorithm within an encryption infrastructure employing secret and private keys including a wireless network having individual subscribers who access the wireless network using handheld wireless components for implementing a compatible encryption algorithm using time variable secret or private keys uniquely associated with the respective individual subscribers. The certification apparatus would include a plurality of key generating components adapted to be mounted, respectively, on the bodies of the subscribers. Each of the key generating components would include key generating components for generating a time variable key for use in uniquely identifying the individual on which the component is mounted, and wireless transceivers for broadcasting, in a limited zone surrounding the individual on which the key generating component is mounted, a time variable key that can be used in the handheld component to create an encrypted message suitable to be broadcast by the handheld device over the wireless network. Finally the certification apparatus could include a certification authority for implementing the encryption algorithm to allow encrypted communication between the certification authority and each of the individual subscribers over the wireless network, including a memory for storing an operating program and for storing subscriber identification information adapted to be associated with time variable key information corresponding to the time variable keys generated in each of the corresponding key generating components and used by the respective handheld components to form an encrypted message for transmission over the wireless network to the certification authority wherein the certification authority can authenticate any encrypted message forwarded to said certification authority as coming from a particular individual by implementing an authentication routine of the encryption algorithm using the associated time variable key information.

The added security of the subject invention enables implementation of another embodiment involving a personal communication system that is designed to integrate all of the communications needs of an individual. In particular, the added security of using a pair of differentiated wireless, personal communication components as described above would allow all of the communications needs of an individual to be implemented via a single integrated console that is adapted to be placed in the home or office and is adapted to be connected directly to the landline service and cable service (e.g. cable modem) by direct connection and wireless linkage (e.g. via WiFi or Bluetooth) to an individual's cellular telephone when carried on his person, in his home or when placed in a docking station such as offered by RCA and described in an article appearing in the New York Times on Aug. 8, 2005, Business Section.

Interfacing circuitry operated by a microprocessor based controller within the console could be designed to allow the individual's personal communications needs to be satisfied via communications software implemented by the controller in response to instructions or criteria entered into the console directly by the user or indirectly via PC connection or pre programming entered into the system at the time of sale and distribution. The type of instructions that the user can enter will track the type of instructions disclosed in commonly assigned patents (U.S. Pat. Nos. 5,854,985; 6,134,453; 6,934,558 and Re38,787) e.g. instructions for least cost, secure operation, clarity of communication, etc. and combinations of such instructions.

The embodiment of this invention involving the adoption of these consoles would create an entirely new type of business entity, namely as "Omni modal Virtual Communications Network." The function of the virtual network will be to supply equipment and services to individuals that will allow the individual to achieve all of this communications objectives (extreme simplicity, wide range of services, simple billing, high security and low cost by automated transfer among landline, cable and cellular networks). To achieve these objectives, the new business entity would operate without building its own network and thus would have no interest in forcing the end user to use any particular existing network. Instead, the fundamental purpose of the virtual network would be to seek out (in real time) the communication network that best serves the needs of the end user as that user may from time to time indicate. For example, in providing the console to the end user, the virtual network could supply (automatically or when requested by the end user) updated operating software for the console that has the effect of causing the user to be connected with the service that best satisfies the user's needs. More particularly, by continually updating the software in the console the user could be made aware of the latest costs associated with any particular service desired (e.g. voice call, email message, VoIP, instant messaging, downloading of information, internet access etc.) such as the costs associated with a long distance call to a remote area of the world at a given time of day. Based on the type of service requested and preprogrammed information (constantly updated by the virtual network), the console would connect the user to the network that best suits the user's needs.

An extremely important service of the virtual network would be its ability to aggregate subscribers and to negotiate on their behalf for services from cable, landline, long distance, and cellular networks based on substantial market power. After a favorable arrangement is set up, the virtual network could download updates in its subscribers' operating programs whereby, for example, the consoles could be reprogrammed to direct more calls over landlines at certain times of the day or week. The end user would then be provided at the end of every month with a single bill that covers all communications services utilized by the end user including landline, cable, cellular, etc. The pair of differentiated, wireless personal communications components described above would help to insure the convenience and security of the communications services offered by the virtual network.

Because unique identification of individuals is an important part of solving very significant contemporary social problems, such as international terrorism and illegal immigration, the subject invention could materially aid society in helping to fight the negative consequences of being unable to properly and reliably identify individuals.

DETAILED DESCRIPTION OF THE PREFERRED EMBODIMENT

Figure 1:
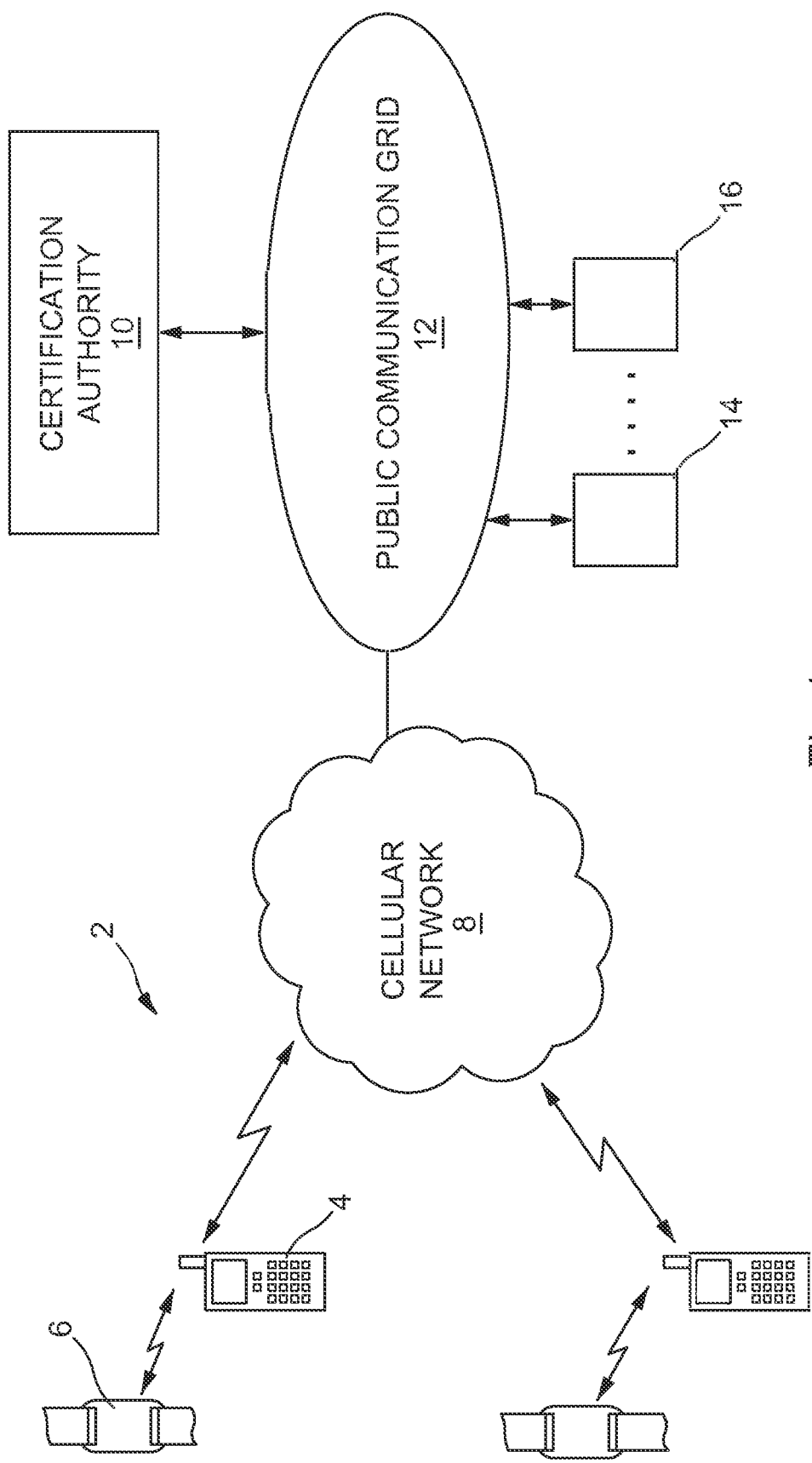
FIG. 1 is a schematic illustration of a system embodying the subject invention.

FIG. 1 is a schematic illustration of the subject invention which involves the application of encryption technology to a personal wireless communication system 2 in a unique manner to solve privacy and reliability problems associated with secure communication and unique user identification. In particular, the subject invention involves the use of differentiated wireless components, including in one embodiment, a specially modified wireless handset 4 (such as a special cellular telephone) and a companion encryption key generating component 6 adapted to be mounted on the body of the individual cellular subscriber who operates the wireless handset 4. These components are arranged to communicate wirelessly with one another and to cooperate in transceiving messages over a conventional public communication network including a cellular wireless network 8. More particularly, the wireless handset 4 is designed to communicate with a certification authority 10 through a public communication grid 12 that may include one or more public communication networks such as landlines, fiber optic cables, microwave links, internet communication lines, etc. The use of separate differentiated wireless components 4, 6 is important to the invention because it provides added convenience for the user while preserving the high level of reliability and security necessary to make practical the wireless and line-of-sight control of authorized access, financial transactions or other functions that depend on secure communication and the reliable unique identification of individuals.

The differentiated components 4,6 form a portable personal wireless communication system 2 for cooperating with the remote certification authority 10 to employ time variable secure key information pursuant to a predetermined encryption algorithm to facilitate convenient, secure encrypted communication. An important aspect of the invention is the provision of the body mounted key generating component 6 which is adapted to be mounted on an individual user's body, in a permanent or semi-permanent manner, for wirelessly broadcasting, within the immediate proximity of the individual, a secret or private key identifying signal corresponding to the time variable secure key information under the control of the certification authority 10. The key identifying signal is generated in a format that facilitates secure wireless communication with the individual in accordance with the encryption algorithm. The key generating component 6 may take the form of wristwatch, wristband, bracelet, patch, headband, neckband, ankleband, legband, card, sticker or the like so long as the component can be permanently or semi-permanently mounted on the user's body. Key generating component 6 may also take the form of a micro chip suitable for being mounted subcutaneously. While this later feature would likely be met with significant resistance at first, it does represent the most secure long term solution to unique identification of individuals using the subject invention. By implementing the subject invention, the individual would continue to maintain complete personal control (via operation of the wireless handheld device) over the operation of the implanted first key generating component and would avoid, thereby, the negative consequences that might otherwise flow from implantation of a circuit that could uniquely identify an individual. However, as noted in commonly assigned U.S. Pat. No. 6,961,584, a system that permits tracking of an individual could provide an alternative to incarceration so long as it satisfies Constitutional rights of the individual.

Figure 2:
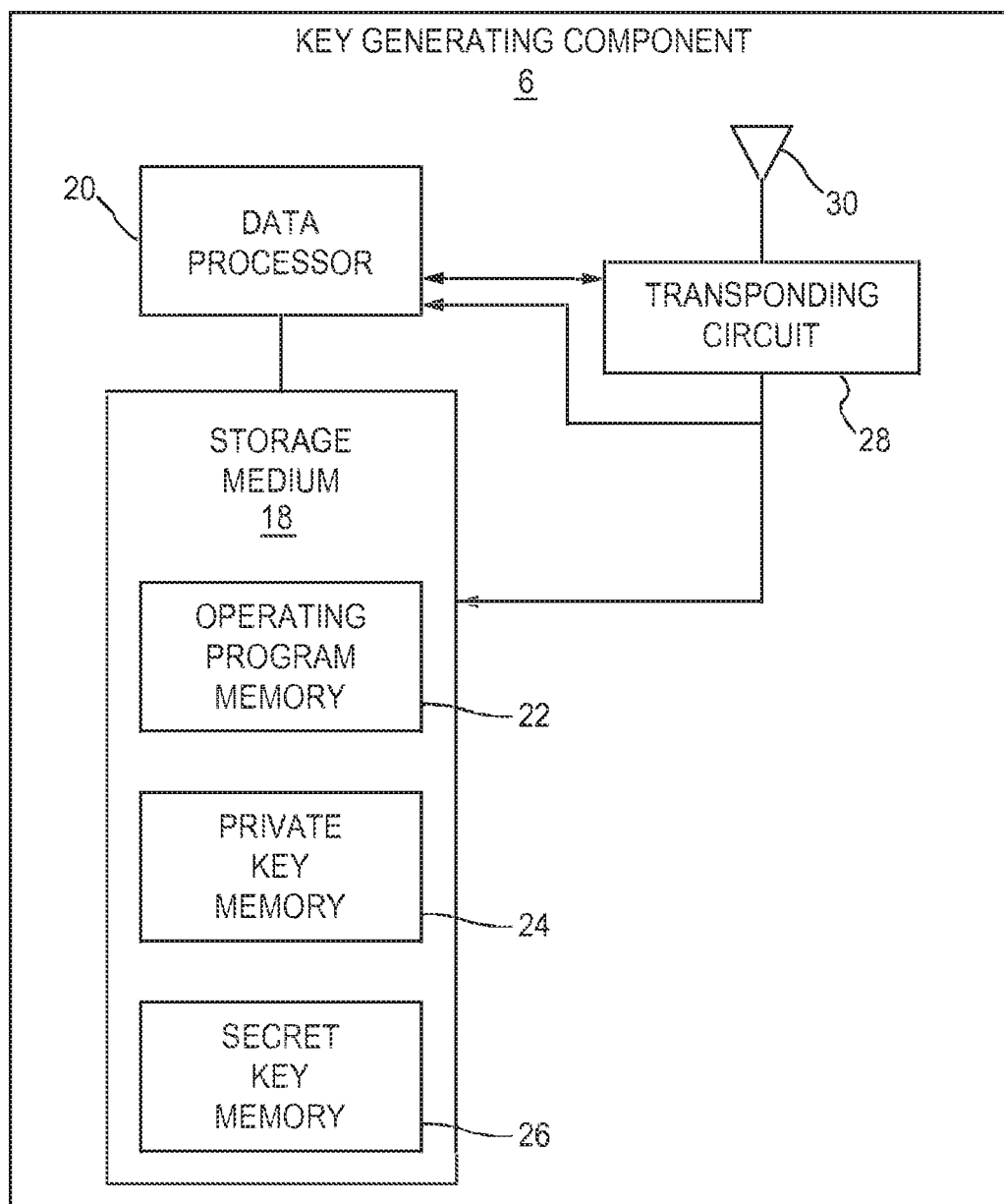
FIG. 2 is a schematic illustration of the body mounted key generating component forming one wireless component of the subject invention.

The key generating algorithm implemented by the body mounted key generating component 6, illustrated in FIG. 2, may include a pseudo random number generation function (as part of the operating program stored in operating program memory 22) corresponding to a similar pseudo random number generation function performed by the certification authority 10. Such a pseudo random number generation permits accurate authentication over time of the identify of the individual to whom the body mounted key generating component 6 has been issued despite the fact that the authenticating key is time variable. The pseudo random number generator used by the key generating algorithm operates to render subsequent authenticating keys unpredictable. To allow for future decryption of stored messages produced by operation of wireless handset 4, the certification authority 10 would keep a historic log of all inactivated secret and private keys associated with each user of paired components 4,6.

The wireless handset 4 may take the form of a cellular phone (or alternatively a PDA or other type of handheld device). Wireless handset 4 is adapted to receive the key signal broadcast by the key generating component 6 for use in implementing secure communication in accordance with the predetermined encryption algorithm. Wireless handset 4 is adapted to receive the key identifying signal broadcast by the body mounted key generating component 6 for use in implementing a wireless and/or line-of-sight link that forms part of a communication channel connected at one end to the wireless handset 4 and connected at the other end to third parties, such as another cellular subscriber 14 or another type of terminal communication device 16 operated by a third party such as a merchant, security facility or other private or government entity. As will be explained more thoroughly below, the other cellular subscriber 14 or other terminal communication device 16 will need to communicate with the certification authority in accordance with the encryption algorithm, whereby the certification authority 10 may operate in accordance with the predetermined encryption algorithm, such as used in a Public Key infrastructure, PKI, to facilitate secure communication between the individual and other cellular subscriber 14 or other terminal communication device 16. The Public Key infrastructure may be of the type disclosed in Ferguson et al. supra. For example, the certification authority 10 may operate to generate and certify sequentially a series of public keys corresponding one to one to a sequentially series of secret or private keys generated from time to time by the body mounted key generating component 6 in accordance with a predetermined PKI key generation algorithm. The time variable key signal broadcast by the body mounted key generating component 6 may be the private key corresponding to the current public key used by the certification authority 10 to facilitate secure communication between third parties and the user who has been authenticated by the certification authority.

By use of the disclosed system, an individual may uniquely identify himself via a wireless or line-of-sight optical signal communicating with an the certification authority 10 operating as an "authenticating authority" in the manner disclosed in Fergus et al, supra, starting at page 97. The certification authority 10 can certify the authenticity of a time varying "authentication signature" prepared by the wireless handset 4 and key generating component 6 organized in accordance with this invention. In particular, any terminal communication device that receives the "authentication signature" certified by the certification authority 10 can have a high degree of confidence that the identity of the person issuing the authentication signature is actually the person identified thereby. The degree of accuracy is determined by the degree of trust that the receiving party may have in the certification authority 10, that is, the "trust relationship" with the authenticating authority. This trust relationship can reach nearly 100% where the trust authority is willing to warrant the identity of the individual and to pay for the consequences if the identity is wrong. For example, if the certification authority is a credit issuing agency, the receiving party can rely 100% upon the certification if the certification authority provides a warrantee that the receiving party will be paid the amount specified in the financial transaction.

As will be explained more fully below with reference to FIG. 2, the key generating component 6 may be arranged to produce a time varying "authentication key" which may be securely broadcast in encrypted form that is suitable for forming the "authentication signature" associated with a particular secure message for transfer over the public communication grid 12 including various communication networks such as cellular, landline telephone, cable, private local area networks or other types of private or public communication networks or webs such as the internet.

Referring now to FIG. 2, the key generating component 6 is designed to be permanently or semi-permanently attached to the user's body and includes a storage medium 18 and a data processor 20 which is capable of implementing, at least, a relatively simple operating program when the key generating component 6 is active. The operating program may be stored in a separate operating program memory 22 or portion of memory 18 reserved therefore. The primary function of the data processor 20 is to retrieve and/or generate the keys required for encrypted communication between key generating component 6 and between the wireless handset 4 and the certification authority and/or other terminal communication devices 16. Because the overall purpose of the key generating component 6 is limited, the complexity of the data processor can be similarly limited. For example the type of encryption capability required of key generating component 6 can be of the relatively simpler variety in which a secret key is known to both the key generating component 6 and to the wireless handset 4 as compared with full PKI data processing. As explained below and more thoroughly in Ferguson et al. at page 279 et seq. practical PKI implementation demands large integer mathematics that requires, in turn, special platform circuitry that is relatively sophisticated as compared with simpler encryption algorithms. The importance of this difference will be easier to appreciate when the encryption functions performed by the wireless handset 4 of this invention are described below.

While the data processor 20 of key generating component 6 does not implement full PKI encryption, it does generate and/or retrieve the time variable "private keys" which are paired with corresponding public keys that can be (or have been) certified by the authentication authority and published to third parties (such as terminal communication devices 18). When so published, PKI encrypted messages many be formed by third parties and sent to the wireless handset 4

(e.g. cellular telephone) from any third party terminal communication device for decryption using the paired "private key" retrieved and forwarded wirelessly to the wireless handset 4 by the key generating component 6. Thus, an important purpose of key generating component 6 will be to store and/or generate the "private keys" necessary for implementation of PKI encryption by the wireless handset 4. As is well understood, each private key in a PKI system is paired with a public key that can be certified as authentic by the certification authority 10. The "private keys" can be stored in a private key memory 24 or can be generated in accordance with a predetermined algorithm. The "private keys" can also be associated with time intervals during which the secret key is valid and after which the private key (and corresponding public key) would no longer be valid. This time varying quality can be coordinated with the certification authority 10 so that the corresponding "public keys" would cease to be valid after a time certain or after each use or in accordance with an algorithm that is agreed to in advance by the certification authority and is implemented by the operating program of the data processor 20.

Similarly, key generating component 6 can store "secret keys" in a secret key memory 26 from which the data processor 20 is able to retrieve the "secret keys" as needed by the operating program stored in the operating program memory 22. These "secret keys" can be used by the key generating component 6 to encrypt the private keys retrieved or generated by data processor 20 for wireless broadcasting to wireless handset 4. When used to encrypt a private key for broadcast to wireless handset 4, it is generally necessary for the same secret key to be known by the wireless handset 4 in order to decrypt the wireless signal and retrieve thereby the private key that can henceforth be used to decrypt encrypted messages received from third parties who created the encrypted message using the corresponding public key.

A skilled artisan will recognize from the disclosure herein that the cryptographic keys may advantageously include some or all of symmetric keys, public keys, and private keys. In addition, a skilled artisan will recognize from the disclosure herein that the foregoing keys may be implemented with a wide number of algorithms available from commercial technologies, such as, for example, RSA, ELGAMAL, or the like.

Another function of the "secret keys" is to allow for encrypted communication between the wireless handset and the certification authority 10. Such secret keys can be useful in coordinating the private/public key pairs that are currently valid. In other words it might be necessary for the individual user to inform the certification authority 10 that he/she is using a new wireless handset because an earlier handset has been lost, misplaced or stolen. In such a circumstance the existence of a secret key known only to the individual user (who is still in possession of his key generating component) and to the certification authority 10 would be essential for the certification authority 10 to know that it was receiving a message that was authentic and could be relied upon to cause the certification authority to refuse to authenticate any further messages that might be received from the lost, misplaced or stolen handset.

When a secret key is retrieved for use in encrypting a message to be sent to the certification authority for purposes of authenticating the identity of the user of the body mounted key generating component 6, the secret keys can be considered authentication keys corresponding to authentication keys held by the authentication authority 10. When operating in this mode, the key generating component 6 can be turned on or off by the individual either through a signal sent from the handheld device or via a touch sensitive switch associated with the key generating component.

Another important feature of the first component is its ability to wirelessly broadcast the authentication keys when desired by the user either automatically (subject to being turned on or off by the user) or upon response to an activating and/or energizing signal produced by user command or by receipt of a wireless signal requesting an authorizing signal. When operating in the later mode, the key generating component 6 would behave as a transponder and would include a transponder circuit 28 and associated antenna 30 that causes the broadcasting of a secret or private key signal upon receipt of an inquiry signal whereby the key signal would be retrieved from memory or would be generated in a manner that corresponds to key signal information retained/generated by a certification authority that is capable, among other things, of uniquely identifying the individual upon which the first component is mounted.

Figure 3:
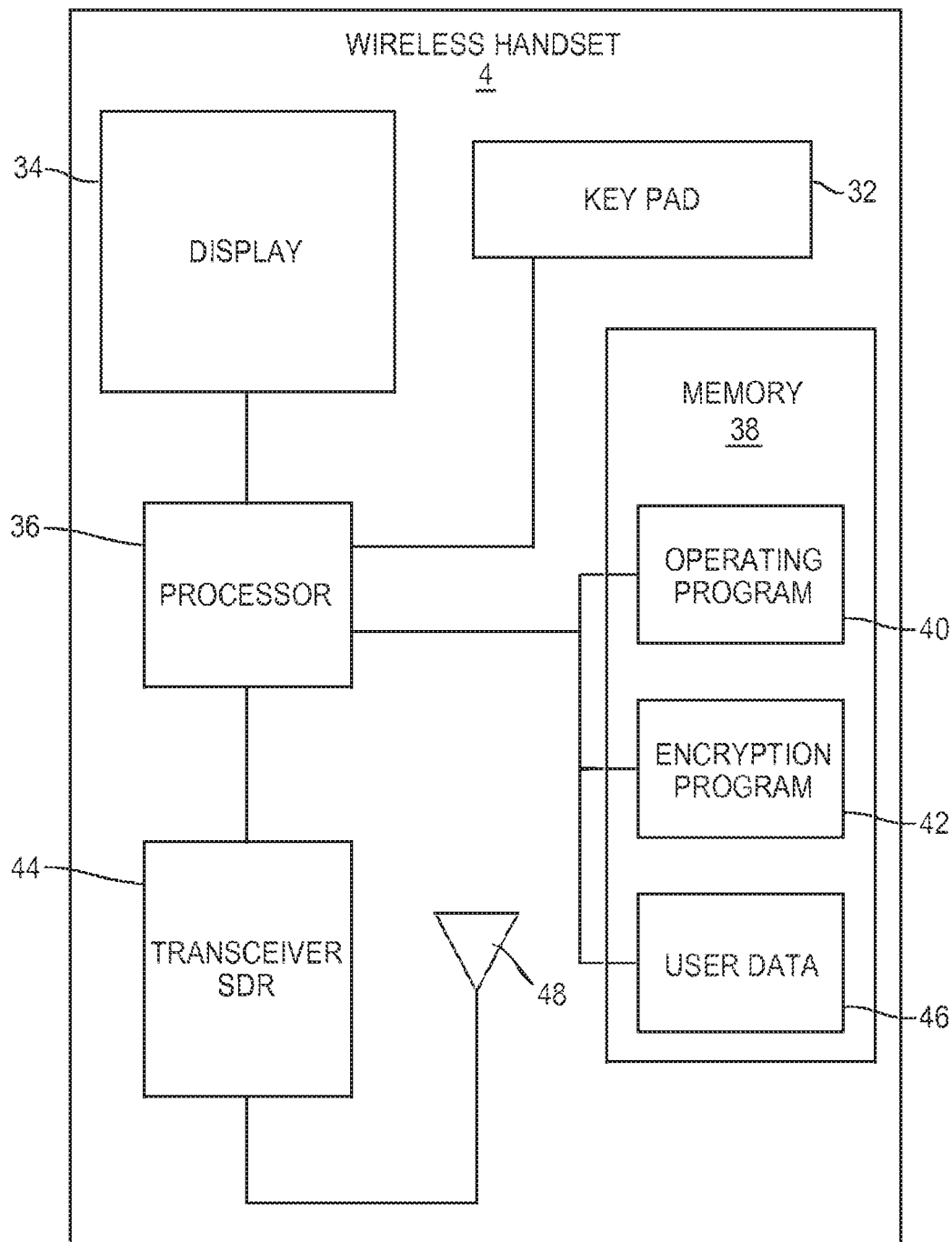
FIG. 3 is a schematic illustration of the wireless handset forming the second wireless component of the subject invention.

A wireless handset 4, designed in accordance with the subject invention, is illustrated in FIG. 3. The wireless handset 4 may take the form of a portable personal communication device such as a PDA, smartphone cellular telephone or other type of handheld device which is characterized by a relatively robust data processing capability. Using this capability the wireless handset 4 would be capable of receiving, wirelessly, a secret or private key, such as an "authentication key," from the first component for use in encrypting a message to be sent wirelessly from the second component or a private key that is paired with a previously published "public key" for use in decrypting a message forwarded from a third party who used the public key to encrypt a message sent wirelessly to the handheld component. Public key encryption/decryption requires large integer processing capability and thus the key generating component 6 would preferably be equipped with special platform specific circuitry and software suitable for this purpose.

By employing a wireless handheld 4 such as a cellular telephone, PDA or smartphone as an important component in the practical implementation of this invention, billions of human beings can potentially benefit from the operation of a single or relatively small number of certification authorities to facilitate unique identification of individual users. Implementation of the subject invention will require cell phone subscribers to be provided with a separate body-mounted key generating component 6 that is procured at the same time as the cellphone, PDA or other type handheld wireless device adapted to access the cellular network or other private or public communication network.

Each of these steps of key retrieval and subsequent encryption and decryption will become necessary precedents for the user to obtain desired functions, such as a secure financial transaction, admission into a secure facility, and/or the sending or receipt of any other type of communication requiring security and reliability. However, the user will not be inconvenienced in any way since the process would be entirely automated and transparent to the user except in circumstances when a password entry was required or the user was required to manipulate the handset in order to allow for line-of-sight reading of an encrypted message, such as a bar code display on the handset display screen.

As will be discussed more fully with respect to FIG. 3, wireless handset 4 may include a user interface (including a touch sensitive device, such as a key pad 32 and a display 34) that affords the user the ability to monitor and to control the wireless communication process. An important characteristic of the subject invention is that wireless handset should allow the user efficient control over the functions of the invention while at the same time protecting the user's privacy. This functionality is achieved by causing the system to become automatically incapacitated should the wireless handset 4 be separated from the immediate vicinity of the user by being, for example, lost, misplaced or stolen. In this regard the wireless handset 4 may take the form of a cellular telephone, smartphone or other type of wireless PDA adapted to communicate over a variety of different wireless networks including any one or a combination of local networks; WiFi or other low power, wireless technology permitting public use or access; cellular networks, such as OSM, CDMA, TDMA, AMPS etc; or other type of public or private network such as a business operated LAN or public network or web including the internet.

Referring more specifically to FIG. 3, a schematic of a wireless handset 4 is disclosed including a processor 36 that operates to implement an operating program stored in an operating program memory 40 that forms part of memory 38. Processor 36 also functions to implement an encryption algorithm or program stored in encryption program memory 42. Processor 36 also serves the data processing and control functions normally performed by the processor of a wireless handset such as a cellular telephone, PDA or other type of personal communicator. To provide a wireless communication link, handset 4 is provided with one or more transceivers 44 that are adapted to operate selectively within predetermined frequency bands appropriate for the wireless communication network or device being accessed. Transceiver 44 may be a software defined radio (SDR) which means that the transceiver is capable of shifting to a variety of different radio spectrum bandwidths in response to a digital control signal. Similarly, transceiver 44 may respond to digital control signals to implement different communication protocols such as GSM, CDMA, TDMA, AMPS, WiFi, Bluetooth or other type of communication protocol by which networks may be accessed, messages and/or data is formatted and broadcast or received and other types of communication services are acquired. As processor 36 implements the various programs and responds to user commands entered via the key pad 32, data is retrieved or stored in memory 46.

As shown in FIG. 3, wireless handset includes at least one antenna 48 suitable for broadcasting and receiving radio broadcast signals. The antenna may be mounted either internally or externally of the handset housing (not shown). When required to achieve the desired level of performance, multiple or specialized broad band antennas many be employed.

One particularly desirable application of the subject invention would be to point of sale transactions that are typically implemented today using various types of media including cash, checks, charge cards, coupons, debit cards, bar codes or other media in combination with information such as names, account numbers, passwords, or other information passed between the merchant and customer all of which is designed to uniquely identify the customer and merchant and to memorialize the nature of the transaction in order to effect a legally binding transfer of money and other rights among the parties involved. The subject invention could be used to simplify and automate this process while improving greatly the subsequent verifiability of the parties involved and the nature of the transactions and associated exchange of rights.

In particular, the subject invention could be implemented in a manner that allows for the wireless retrieval of a "secret or private" key from the body mounted first component followed by data processing that would use the "secret or private key" to decrypt an incoming message (that used the corresponding "public key" for encryption) or to encrypt a message that might include one or more of the user's account number from which money is to be transferred, the merchant or service provider's account to which the money is to be transferred, the user's identity, the amount of cash payment, the date and time, the identity of the goods or services being purchased and/or other information relevant to the message. Some or all of this information could be reduced to a bar code (either one or two dimensional) for display on the handset display screen in a form that could be read by a line of sight bar code reader such as bar code readers that are presently installed in most business establishments. Display of a bar code pattern on the handset's display screen eliminates the need for broadcast of a wireless signal that might otherwise be intercepted by an unscrupulous party whose purpose is to misuse the information being broadcast. All of the information could be assembled via a relatively straight forward data capture via the merchant's bar code reader with subsequent wireless downloading (via for example a Bluetooth link) of the information to the purchase's handset followed by encryption of all or selected portions of the information to the purchaser's handset followed by encryption of all or selected portions of the information into an encrypted bar code for display on the handset display screen. The bar code image could include the user's identity and account number encrypted using the downloaded encryption key in a manner that would allow the certification authority to authenticate the identity of the user. At the same time the encrypted bar code image could be retained by both the merchant and the purchaser for subsequent verification of the transaction. Because the bar code image is encrypted it could not be decrypted except by the certification authority and/or the user to derive the identity of the purchaser. The only other way the bar code image could be decrypted would be by someone who has obtained unauthorized access to the "key" but because of the nature of this invention, the changes that the "key" could be derived or obtained in this way would be quite small.

In circumstances described above, the merchant would look to the certification authority to guarantee payment since the guaranteeing authority would have presumptive proof that the user/purchaser had, in fact, authorized the transaction. The important point is that the merchant would not have retained information associating the purchaser with the user's identity and/or accounts in a manner that would permit the merchant to pass on information to third parties or to enable mischief should the merchant experience a breach in its secure business/account records.

Should the merchant need to subsequently contact the purchaser, he could do so through the certification authority. If the merchant should need to keep a record of multiple purchases for a user he could do so and record the encrypted bar code image for each transaction. The purchaser could choose to provide his name and address but he would never need to provide the merchant with his bank or credit card account number and certainly not his encryption key in a manner that would allow the merchant or unscrupulous third parties to charge unauthorized amounts to the purchaser's account. By use of the disclosed system, the merchant could keep an accurate, verifiable record of the history of the customer's transactions with the merchant, but the merchant's records would not include sufficient information for anyone (including an unscrupulous employee) to effect a credible impersonation of the customer. The merchant would not even need to maintain the customer's personal identification information since all contacts with the customer could proceed through the authentication authority.

Implementation of the subject invention involving point of purchase encrypted bar code image generation and reading would be relatively straight forward since much of the required infrastructure is already widely disseminated and used today. For example, bar code readers are virtually ubiquitous throughout retail stores and outlets and are connected by modem and public communication networks to certifying authorities. As noted above cellphones and other wireless handheld communication devices are constantly being updated and provided to new users at the astounding rate of nearly one billion per year and growing. This rate of dissemination of new handsets provides a vector for introducing complex data manipulation algorithms including complex encryption techniques. Operation of certifying authorities by cellular service providers, credit card companies, banks, businesses and other organizations is also already widely practiced. Implementation of the subject invention would, therefore, require only straight forward software changes within the certifying authorities, and mostly software changes that could be implemented relatively easily as users update the cellular or other type wireless handsets. Only the body mounted key generating components would be new but the adoption of such components would likely be welcomed by most users because of the added levels of protection and functionality that it would afford them.

As merchants update their financial transaction equipment, point of sale equipment could be installed to implement alternative communication links with the user's handheld equipment including low power wireless links (Bluetooth, WiFi, or other) to effect the necessary transfer of information regarding the transaction and the transfer of the encrypted message involving the transaction produced through use of the downloaded key. The resulting encrypted message, that could take the form of an encrypted bar code image (or its data stream equivalent), could be relied upon by the purchaser, the merchant and the certification authority as presumptive proof of the purchasing event and as to the identity of the purchaser.

Of particular significance with respect to the utility of the subject invention is the fact that many new cellular telephones (particularly cellular telephones known as "combo" phones) incorporate transceivers (such as separate transceiver modules or software defined radios, SDR) that are capable of operating at relatively low power for sending and receiving data using unlicensed radio spectrum in accordance with a standardized communications protocol such as Bluetooth or WiFi. Such multi-mode cellular handsets are thus suitable to implement VoIP communication when the user is within operating range of a WiFi portal ("hotspot") or other type of low power wireless transceiver that is able to wirelessly link the user to a public or private communication network. At other times the "combo" phone would wirelessly access a cellular network to secure communication services from a licensed cellular service provider. A combo phone of this sort would have its range of useful functionality greatly expanded by being augmented with circuitry and software that implements the features of this invention. In particular, such an augmented combo phone could be used to secure authorized access to facilities having an appropriate interactive WiFi portal that could receive an encrypted signal identifying the user. The portal could be connected to certain biometric sensors such as a fingerprint or retina scanner or other type of sensors to generate individual identifying signals. The authenticating key retrieved from the body mounted first component may, in turn, be forwarded wirelessly to a WiFi portal and combined with other individual identifying information derived from the biometric sensors. In addition or alternatively, the user might enter, into a portal interface or via the keypad of the combo phone, a password for wireless transmission to the WiFi portal where it could be forwarded to a certification authority with whom the user had previously registered to secure an identity certification that could be digitally signed and returned to the operator of the WiFi portal. In accordance with well understood encryption technology the communication link between the portal and the certification authority would be relatively immune from attack and thus the WiFi portal operator could reliably act on a returned communication from the certification authority indicating that the user seeking access was in fact the person whose identity is being certified. In this situation, so long as the WiFi portal operator has "trust" in the integrity of the certification authority, the portal operator can be very certain that the user requesting access is in fact entitled to be given access.

By using two separate components, one body mounted permanently or semi permanently and the other a hand held device that is wirelessly connected to the first component to receive the secret or private key, it will be possible to achieve relative immunity from unscrupulous attack while preserving substantial user convenience. For example, the secret or private keys stored and/or generated and transmitted wirelessly by the first component could be time variable and thus suitable for encrypted communication or unique user identification only once or for a limited number of times. For example, because, the key generating component requires far less data processing capability and only short range wireless communication capability, it can be permanently or semi-permanently attached to the user's body such as by being incorporated into a wrist watch, ring, bracelet, or even mounted subcutaneously. The hand held device, on the other hand can have a much greater data processing capability and much greater wireless broadcasting range. These qualities allow the handheld component to decrypt incoming messages using large integer mathematics as is necessary in certain PKI encryption systems. Most importantly, loss of the handheld device, should it occur, would not create a breach in system security because the secret or private key information retrievable from the body mounted component would be time variable in accordance with pre-arrangement with the certification authority. Alternatively, the secret or private key information could be valid for only a limited window of time again in accordance with a pre-arrangement with the certification authority.

The use of these two types of differentiated components, if designed and operated in accordance with this invention, can give rise to a relatively high degree of immunity from unscrupulous attack. For example:

1. Attempts to Use a Stolen or Lost, Hand Held Device ("Second Component")

Once the handheld device is outside of the limited broadcast range of the first component, an unauthorized user would find that the handheld device is inoperable for any function that requires retrieval of a time variable key. It would be unlikely that both the body mounted component and the handheld component would be lost simultaneously or that they could be stolen without the knowledge of the legitimate user. Should the later occur, the user could immediately contact the certification authority for deactivation of all keys generated or stored in the first component. Another approach would be to arrange the handset to become inoperable once it is outside of the broadcast range of the first component which could be implemented by having the handheld unit frequently issue an "are-you-there" interrogation signal requiring a wireless signal response essentially indicating "I-am-here." In the absence of such a response, the handheld device could be programmed to cease operation.

2. Attempts to Wirelessly Download Keys Stored or Generated by the First Component Using an Outside Transceiver.

This method of attack can be thwarted by using a method of encrypting the wireless communication between the two components in a manner that ensures that the interrogation signal is encrypted or includes a password and the broadcast secret or private key information is encrypted using additional encryption of the secret or private keys. Encryption of the secret or private keys can be achieved by known techniques involving an exchange in advance of secret "intra component" keys between the two components at the time of initial operation or involving the entry of a password into one or both of the components.

3. Attempts to Intercept Wireless Communications between the First and Second Components and Wireless Communications between the Second Component and Third Party Transceivers.

All such communications can be/will be encrypted in some manner during the time that secure communication and/or unique identification is desired. Interception of these wireless signals will not permit the intercepting party to discover the encrypted information or to determine the secret or private keys. Even if the later were somehow determined, the limited time during which any given key is valid would severely limit the amount of mischief that the unscrupulous interceptor would be able to perpetrate a wrong.

The subject invention is particularly well suited to the adoption of a various levels of security depending upon the need for added levels of confidence in the accuracy of the information being transmitted such as the identity of the user. For example, the handheld device could be programmed to require entry of a correct user password before a particular communication function would be performed or certified. Should still more security be required the handheld device could be equipped with biometric sensors for determining certain unique individual characteristics such as fingerprints or retina patterns or other DNA based characteristics of the user or combinations thereof. All or any part of this additional information could be included in the secure communication to the certification authority where it can be compared to information previously secured and stored to determine the authenticity of the user who has initiated the secure communication.

One of the advantages of the present invention is that the cellular handset can be designed to become inoperable when it is more that a certain minimum distance from the body mounted key generating component. This feature can be implemented by causing the cellular handset to broadcast a transponder signal and by including a transponding circuit 28 and an antenna 30 in the body mounted key generating component to return a wireless activating signal which would allow the cellular handset to operate. The inactivation of the handset could be limited to use of the phone to make outgoing calls or send other type outgoing messages but allow incoming calls to be received so that the user could still call her phone should it be misplaced. In this manner the audible ring could still be used to help the user locate a misplaced cellular phone yet the phone would be useless in the hands of someone who has acquired the phone without permission of the owner and tries to make outgoing calls.

Figure 4:
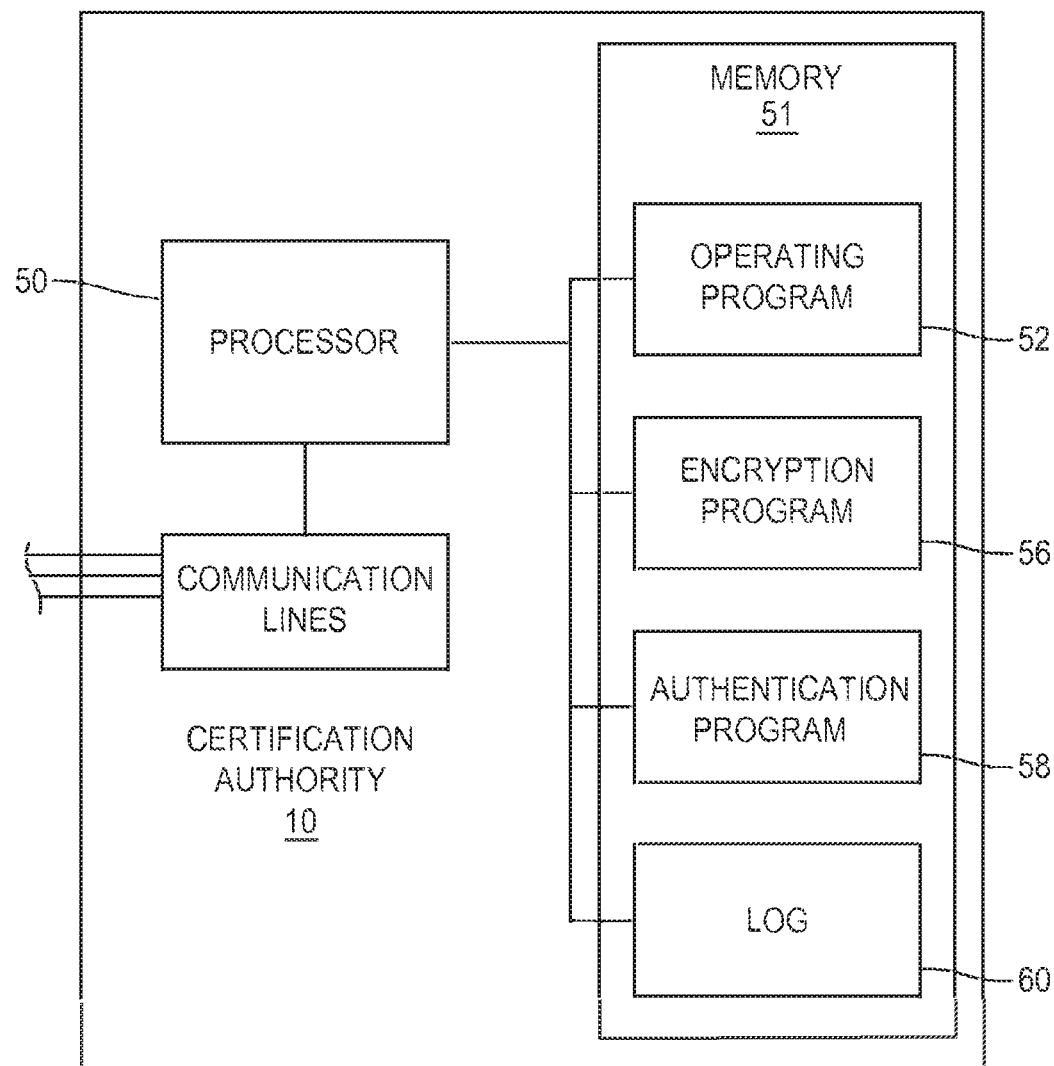
FIG. 4 is a schematic illustration of a certification authority in accordance with the subject invention.

FIG. 4 is a schematic illustration of the certification authority 10. In particular, the certification authority 10 includes a processor 50 which may take the form of a main frame computer that is capable of extremely high speed parallel data processing. Processor 50 may actually be a network of multiple parallel processors capable of manipulating massive amounts of information behind high security firewalls and communicating with one another over secure communication links as is well understood in the industry. Processor 50 will implement a complex operating program, stored in memory 51 including an operating program memory 52. As part of its function, processor 50 will manage multiple communication lines 50 which will include banks of communication modems allowing processor 50 to simultaneously communicate with multiple users of the disclosed system. Of particular criticality, processor 50 will implement an encryption/decryption algorithm in accordance with a program stored in encryption program memory 54. An authentication process associated with the receipt of requests for authentication, all as described in greater detail in Ferguson et al., supra, would also be implemented by processor 50. The various algorithms required for implementing the authentication process would be controlled by an authentication program stored in authentication program memory 58. As was explained above, the various public and private keys associate over time with each of the system users would be generated by processor 50 and stored in memory 51 including a log 60 of time variable keys of each of the system users. By keeping such a log, the disclosed system would be able to decrypt and/or authenticate messages sent to and received from system users over an extended time period.

The certification authority, CA, could be operated by a single cellular network service provider or by a combination of cellular network service providers or by a separate CA service provider that could be either privately or governmentally sponsored. For example, a cellular service provider might find it desirable to offer a credit card/debit card sponsored service as part of its range of services. A CA servicing each cellular subscriber for that particular network service provider could also provide certifying functions for the various merchants who agree to allow the subscribers to use their cell phones as virtual credit cards or debit cards. The present invention contemplates that an entire business method could be fashioned around the provision of body mounted key generating components to cellular customers having cellular phones designed to interact with companion key generating components. This business method could be implemented by the cellular service provider or it could be implemented entirely independently with certifying services and companion credit card/debit card services being offered to all of the customers of one or more cellular service providers. The development of the operating standards and implementing software for the CA, cellphones and companion body mounted devices could also be provided pursuant to a franchising business method in much the same way that Visa or Mastercard licenses are granted to banks and other financial institutions.

Another advantage of the subject system is that a user who loses, misplaces or has stolen his portable handheld component, can simply secure a replacement component without requiring any special advance or security type communication with the certification authority and/or with the communication network such as cellular service provider. By storing all of the required secret or private keys for secure communication and unique identification of the user in the body-mounted component, the user can recommence communication by use of a replacement unit capable of wirelessly communicating with the body mounted component. The certification authority and the wireless provider (if a separate entity) can be reasonably certain that the person who possesses the body mounted component is, in fact, the person who was issued the keys contained in the body mounted component since the chances of the body mounted being lost misplaced or stolen is much lower than the handheld unit.

To prevent downloading of secret or private keys to unauthorized handheld devices, the system of the subject invention is designed to require entry of a password by the user into the replacement handheld to be included in an interrogation signal sent wirelessly to the body mounted unit. Even better would be the requirement that the same password by entered by the user into both the body mounted component and the handheld component. To implement this function, the body mounted component would desirably be equipped with some type of keyboard or other touch sensitive element or otherwise have means allowing for user input of the password.

Another aspect of the subject invention would be the provision of a biometric sensor on the handheld device to be used to secure retrieval of a stored secret or private key from the body mounted component. Such a device could take the form of a fingerprint scanner, retina scanner, voice pattern recognition or other type pattern recognition sensor, or more sophisticated biometric sensor that is capable of sensing as unique biometric characteristic of the individual such a DNA sensor.

An additional feature of the subject would include the capability of the body mounted component to optionally interact wirelessly with an alternative communication station (which can be called a "public portal") located at a point of purchase location (e.g. vending machine, retail store, gasoline station), public telephone equipped to interact with the body mounted component (e.g. inside a building where the cellular telephone service is poor) or specially adapted pay phones equipped with interactive circuitry for receiving a user password or other unique identifier such as a biometric related identifier. As an example, a user might enter a a user might be in office building or airport or other public location where cellular reception is poor or becomes poor during a telephone conversation. A user could simply approach a specially adapted portal (such as a modified pay phone) that allows the body mounted component to be wirelessly linked. The portal could react to a request for service from the user or the body mounted component in a manner to audibly or visually invite the user to enter a pass word that is then wirelessly transmitted to the body mounted component via a transponding signal requesting the body mounted component to release a "one time useable" secret "key."

Implementation of the present invention would not, of course, prevent theft of the secure wireless token along with the wireless handheld device. However, prior knowledge of both the passive and active identifiers, such as via a breach in the authenticating authority could still give rise to misuse until the individual discovers that her entire wireless communication system was missing. Discovery and/or the theft of all of these components of the subject secure communication system would be extremely rate. The major exception would be instances of kidnapping or abduction in situations where highly sophisticated and knowledgeable individuals, intent on doing harm, could force an individual to provide the necessary active and passive identifiers to enable financial transactions, secure entry into secure facilities or otherwise misuse the subject system.

The system could be organized to recognize unusual patterns of use that would prompt appropriate inquiries, such as:

1. special questions requiring answers that only the user would know
2. notification of other individuals (other family member, business colleagues or authorization authority) who could verify that the user was operating in an appropriate way
3. law enforcement authorities in certain instances The system could be programmed to emit GPS signals to aid in the location of an abducted individual. To discourage physical coercion for an individual to surrender both components of the subject invention, it could be recommended that the user include a bogus body mounted component that could be surrendered while the active body mounted element is maintained in the user's possession.

The added security of the subject invention enables implementation of another embodiment involving a personal communications system that is designed to integrate all of the communications needs of an individual. In particular, the added security of using a pair of differentiated wireless, personal communication components as described above would allow all of the communications needs of an individual to be implemented via a single integrated console that is adapted to be placed in the home or office and is adapted to be connected directly to the landline service and cable service (eg cable modem) by direct connection and wireless linkage (eg via WiFi or Bluetooth) to an individual's cellular telephone when carried on his person in his home or when placed in a docking station such as offered by RCA and described in an article appearing in the New York Times on Aug. 8, 2005, Business Section. In this embodiment, the console would include interfacing circuitry operated by a microprocessor based controller within the console could be designed to allow the individual's personal communications needs to be satisfied via communications software implemented by the controller in response to instructions entered into the console directly by the user or indirectly via PC connection or pre programming entered into the system at the time of sale and distribution. The type of instructions that the user can enter will track the type of instructions disclosed in commonly assigned patents (U.S. Pat. Nos. 5,854,985; 6,134,453; 6,934,558 and Re38,787) e.g. instructions for least cost, secure operation, clarity of communication, etc. and combinations of such instructions.

The embodiment of this invention involving the adoption of these consoles would create an entirely new type of business entity, namely an "Omni modal Virtual Communications Network." The function of the virtual network will be to supply equipment and services to individuals that will allow the individual to achieve all of his communications objectives (extreme simplicity, wide range of services, simple billing, high security and low cost by automated transfer among landline, cable and cellular networks). To achieve these objectives, the new business entity would operate without building its own network and thus would have no interest in forcing the end user to use any particular existing network. Instead, the fundamental purpose of the virtual network would be to seek out (in real time) the communication network that best serves the needs of the end user as that user may from time to time indicate. For example, in providing the console to the end user, the virtual network could supply (automatically or when requested by the end user) updated operating software for the console that has the effect of causing the user to be connected with the service that best satisfies the user's needs. More particularly, by continually updating the software in the console the user could be made aware of the latest costs associated with any particular service desired (eg voice call, email message, instant messaging, downloading of information, internet access etc.) such as the costs associated with a long distance call to a remote area of the world at a given time of day. Based on the type of service requested and preprogrammed information (constantly updated by the virtual network), the console would connect the user to the network that best suits the user's needs.

An extremely important service of the virtual network would be its ability to aggregate subscribers and to negotiate on their behalf for services from cable, landline, long distance, and cellular networks based on substantial market power. After a favorable arrangement is et up, the virtual network could download updates in its subscribers' operating programs whereby, for example, the consoles could be reprogrammed to direct more calls over landlines at certain times of the day or week. The end user would then be provided at the end of every month with a single bill that covers all communications services utilized by the end user including landline, cable, cellular, etc. The pair of differentiated, wireless personal communications components described above would help to insure the convenience and security of the communications services offered by the virtual network.

Many of the benefits derived from commonly assigned U.S. Pat. No. 6,961,584 could be transferred to the new system as described above. For example, automated transfer of the communication link from one network to another during an ongoing communication session could be facilitated by the console and the omni-modal virtual network and its arrangements with the various network service providers. Accordingly, if a communications session starts on a cellular network link that starts to degrade, the user could simply command the handset to improve the call quality in some way. Software in the handset/or home console would check to determine what alternative network services might be available (such as landline, VoIP or alternative wireless network) in order to reroute the call during the call session. MLR has recently received a Notice of Allowance of claims directed to certain aspects of this concept.

By using the cellular handset to uniquely identify the end user, the new communications console could be programmed to cause all incoming calls to be routed to the handset in the home or office that is nearest to the end user. In other words the ultimate "follow me" function could be performed automatically simply by virtue of the end user moving about his home, office, car or even public places with all incoming calls being routed to the equipment closes to the end user that is capable of delivering the type of information (eg. incoming voice call, text message, video file, etc.) contained in the incoming call.

Additionally, other combinations, admissions, substitutions and modifications will be apparent to the skilled artisan in view of the disclosure herein. Accordingly, the present invention is not intended to be limited by the description of the preferred embodiments but is to be defined by a reference to the appended claims.

What is claimed is:

1. A wrist mountable component for enabling a smartphone to send and receive encrypted messages over a communication network or networks connecting the smartphone to remote devices using a first encryption algorithm when said wrist mountable component is connected via a wireless link to the smartphone, said wrist mountable component comprising:
   a. a band for mounting said mountable component on the user's wrist;
   b. a secret key circuit for forming an encrypted signal in accordance with a second encryption algorithm using a secret key available to both said wrist mountable component and to the smartphone; and
   c. a wireless transceiver, connected with said secret key circuit, for wirelessly broadcasting said encrypted signal over the wireless link in the vicinity of said wrist mountable component;
   wherein operation of said secret key circuit and said transceiver enables the smartphone to perform certain functions including wireless communication in accordance with the first predetermined encryption algorithm whenever the smartphone is within the vicinity of said wrist mountable component, said smartphone being incapacitated for performing said functions wherever the smartphone is outside of the vicinity of said wrist mountable component.

2. The wrist mountable component as defined in claim 1, wherein said functions would include outgoing calls or messages and does not include certain incoming calls.

3. The wrist mountable component as defined in claim 1, wherein the first encryption algorithm includes generating an authentication signature, and said secret key circuit includes an encryption key generator for generating the encryption key signals suitable for use by the smartphone in implementing the first encryption algorithm to generate the authentication signature.

4. The wrist mountable component as defined in claim 3, wherein the first encryption algorithm includes communicating with a certification authority to authenticate the user as part of a public key infrastructure.

5. The wrist mountable component as defined in claim 3, wherein said encrypted signal is broadcast in response to a request signal generated by the smartphone and sent wirelessly over the wireless link to said wrist mountable component.

6. The wrist mountable component as defined in claim 3, wherein said first encryption algorithm enables entry into a secure facility by uniquely identifying the user.

7. The wrist mountable component as defined in claim 3, wherein said encryption algorithm enables point of sale transactions with a merchant by uniquely identifying the user and a merchant in order to create a legally binding transfer of money or other rights.

8. The wrist mountable component as defined in claim 7, wherein said first encryption algorithm enables the smartphone to operate as a virtual credit card or debit card.

9. The wrist mountable component as defined in claim 1, wherein said secret key circuit includes an encryption key generator for generating encryption key signals suitable for use by the smartphone in implementing said first encryption algorithm.

10. A wrist mountable component as defined in claim 9, wherein said first encryption algorithm enables a public key infrastructure including a certification authority and said encryption keys generated by said encryption key generator includes private keys for use by the smartphone in communicating with said certification authority.

11. The wrist mountable component as defined in claim 1, wherein said wireless transceiver includes a Bluetooth transceiver which uses the secret keys to form said encrypted signals for broadcast over the wireless link by said wireless transceiver.

12. The wrist mountable component as defined in claim 1, further including a touch sensitive element for allowing the user to input a password for activating said secret key circuit.

13. A wrist mountable component for providing the time of day and for providing encryption key signals to a smartphone to allow the smartphone to send and receive encrypted messages over a communication network or networks connecting the smartphone to remote terminal devices using a first encryption algorithm including public key encryption for at least some of the encrypted messages, said wrist mountable component comprising:
   a. a band for mounting said wrist mountable component on the user's wrist to display the time of day;
   b. an encryption key generator circuit for generating the encryption key signals suitable for use by the smartphone in implementing the first encryption algorithm to send and receive encrypted messages to and from, respectively, the remote terminal devices; and
   c. a wireless transmitter, connected with said encryption key generator circuit for wirelessly broadcasting in the vicinity of said wrist mountable component the encryption key signal over a wireless link connecting said key generating component to the smartphone when said wrist mountable component is in the vicinity of the smartphone,
   wherein said encryption key generator circuit includes a memory and a processor for executing an operating program stored in said memory to encrypt each encryption key signal via an encryption algorithm using a secret key available in advance to both said wrist mountable component and the smartphone so that the encryption key signal can be broadcast in encrypted form to the smartphone where the encryption key can be decrypted from the encryption key signal by use of the secret key.

14. The wrist mountable component as defined in claim 13, wherein said key generating circuit responds to a request signal broadcast by the smartphone to cause said key generator circuit to generate an encryption key.

15. The wrist mountable component as defined in claim 13, further including key memory for storing encryption keys that have been broadcast or that are available for broadcast to the smartphone.

16. The wrist mountable component as defined in claim 13, wherein said encryption key generator circuit includes generating encryption keys adapted to facilitate encryption communication using a public key infrastructure.

17. The wrist mountable component as defined in claim 13, wherein said encryption key generator circuit includes a random number generator for facilitating the generation of unpredictable encryption keys based on previously generated keys.

18. The wrist mountable component as defined in claim 13, further including a touch sensitive switch for turning on and off the encryption key generating function.

19. The wrist mountable component as defined in claim 13, further including a touch sensitive element for allowing the user to input a password for activating the key generating function of the key generating component.

20. The wrist mountable component as defined in claim 13, wherein said processor for executing said operating program functions to cooperate with the smartphone to recognize unusual patterns of use to detect possible use by an unauthorized person.

21. A wristwatch comprising a key generating component, said key generating component for enabling a smartphone to send and receive encrypted messages over a communication network or networks connecting the smartphone to remote devices using a first encryption algorithm when said key generating component is connected via a wireless link to the smartphone, said key generating component comprising:
   a secret key circuit for forming an encrypted signal in accordance with a second encryption algorithm using a secret key available to both said key generating component and to the smartphone; and
   a wireless transceiver, connected with said secret key circuit, for wirelessly broadcasting said encrypted signal over the wireless link in the vicinity of said wristwatch;
   wherein operation of said secret key circuit and said transceiver enables the smartphone to perform certain functions including wireless communication in accordance with the first predetermined encryption algorithm when the smartphone is within the vicinity of said wristwatch, said smartphone being incapacitated for performing said functions when the smartphone is outside of the vicinity of said wristwatch.

\* \* \* \* \*